Figure 1:
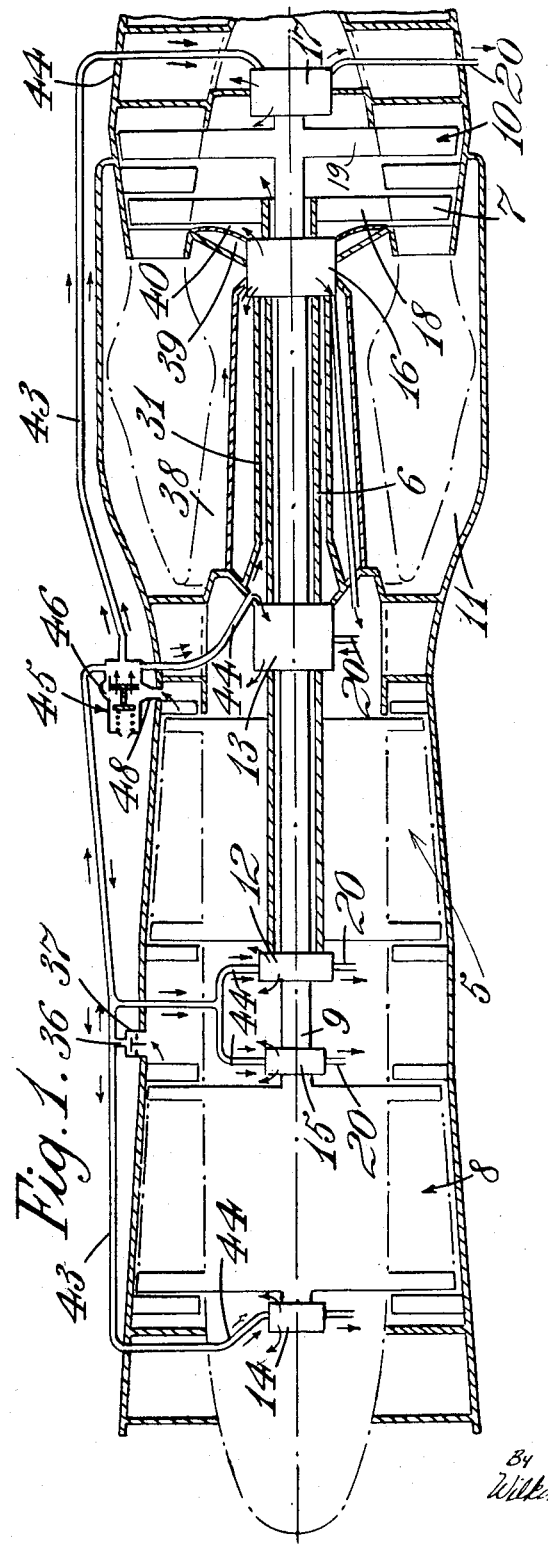

June 5, 1956  S. B. BLACKMAN ET AL  2,749,087
ROTARY MACHINES
Filed April 12, 1952  4 Sheets-Sheet 1

INVENTORS
S. B. BLACKMAN &
E. BRIGGS
By
Wilkinson & Mawhinney
ATTYS.

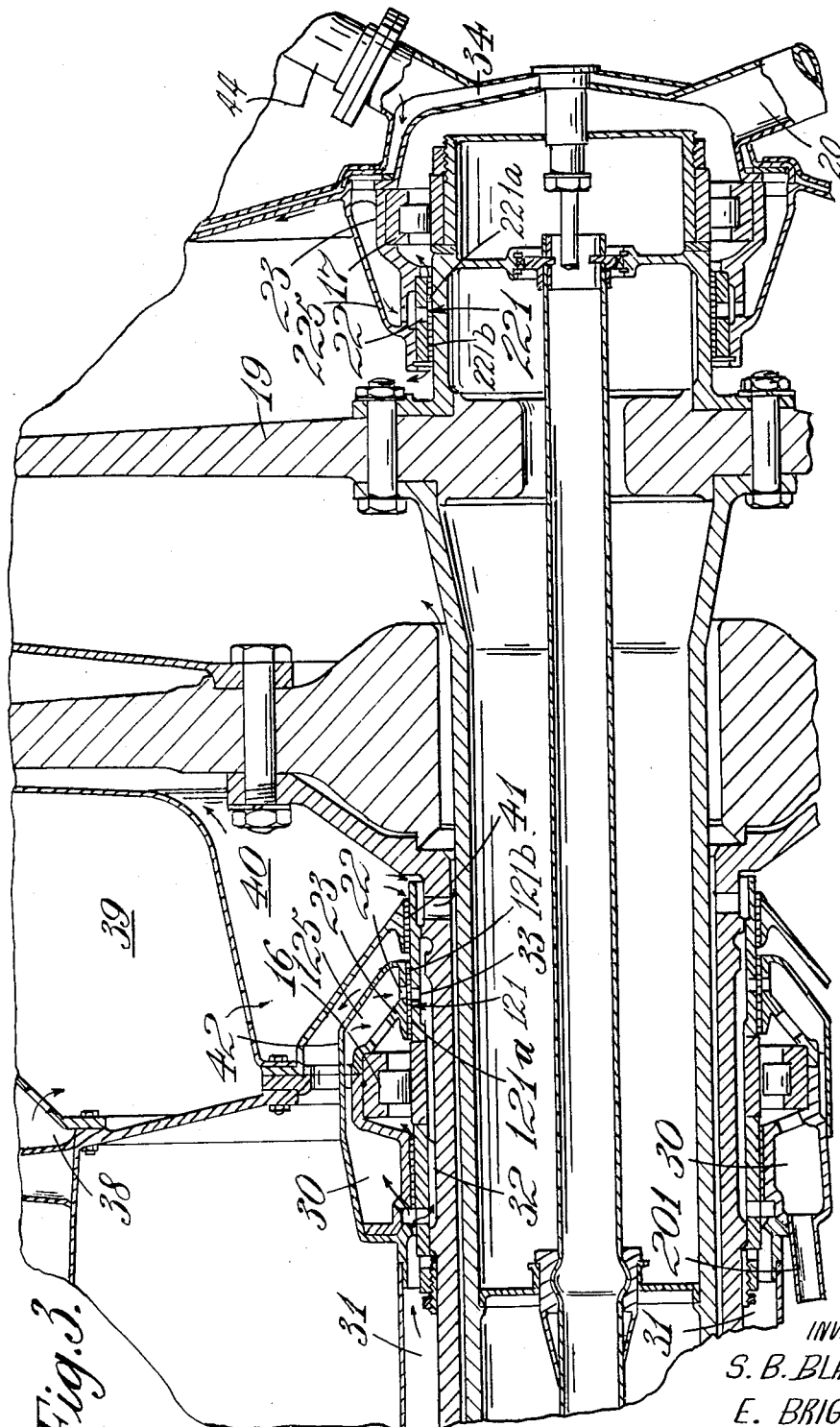

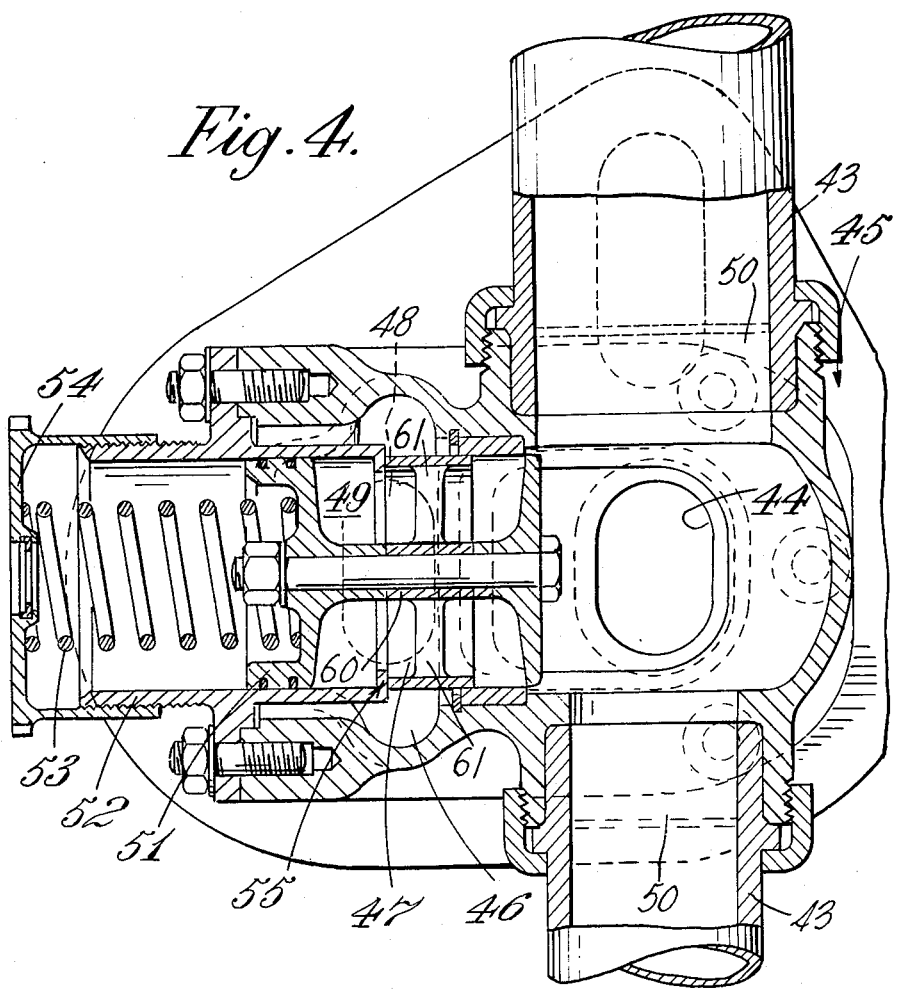

United States Patent Office 2,749,087
Patented June 5, 1956

2,749,087

ROTARY MACHINES

Stuart Bertram Blackman, Westbury-on-Trym, near Bristol, and Ernest Briggs, Filton Park, Bristol, England, assignors to The Bristol Aeroplane Company Limited, Bristol, England, a British company Application April 12, 1952, Serial No. 282,067

Claims priority, application Great Britain April 18, 1951

7 Claims. (Cl. 253—39.1)

In rotary machines comprising means for compressing working fluid it is frequently necessary to bleed off part of the fluid for use in the machine for cooling and/or oil sealing purposes, referred to herein generically as ventilation, thus for example to prevent lubricating oil finding its way from a bearing into a working chamber and there contaminating the working fluid, it is well known to supply fluid under pressure to a groove in a sealing device between the bearing and the chamber so that it leaks out along the shaft towards the bearing and prevents the passage of oil in the reverse direction. In the case of bearings for machines running at high temperatures the fluid may also or principally be employed for cooling the said bearings or adjacent parts of the machine, for example the turbine rotor in the case of a gas turbine.

For use while the machine is running at a substantial proportion of its rated output no difficulty exists in bleeding working fluid at a suitable stage of compression to carry out the desired functions, bearing in mind that the pressure should be kept as low as possible both in the interest of avoiding adverse effect on the efficiency of the machine and of obtaining the ventilating air at the lowest possible temperature, the latter increasing as compression proceeds. When however, the machine may have to operate for substantial periods at low speeds there is a danger of oil contamination of the working fluid owing to insufficient pressure. In the case of a machine operating at high temperature moreover, there is a danger that the heat stored in the hot parts may adversely affect other parts when their ventilation is reduced by the slowing-up of the machine. In the case of a gas turbine engine for aircraft propulsion in which part of the air compressed is used for cabin pressurisation and ventilation both these considerations occur simultaneously.

The object of the present invention is to obviate these objections by arranging for the ventilating pressure to be boosted when it tends to fall below an adequate value.

According to the invention a rotary machine comprising means for compressing working fluid and having a working part ventilated by fluid bled from the compressing means is characterised in that the point in the compression cycle at which the ventilating fluid is bled from the compression system is varied in the sense to maintain the ventilating pressure as the delivery pressure of the compressing means falls.

The invention may be applied to a rotary compressor having a sealing device between an oil lubricated bearing and a working chamber, to which sealing device fluid bled from the compressor is supplied to exclude oil from the chamber, the stage of compression at which the bleed takes place being varied in the sense to maintain the bleed pressure as the compressor delivery pressure falls.

The invention also includes a gas turbine engine comprising a turbine driving a compressor and having a working part of the turbine or compressor ventilated by fluid bled from the compressor in which the stage of compression at which the ventilating fluid is bled from the compressor is varied in the sense to maintain the ventilating pressure as the compressor delivery pressure falls.

In such a gas turbine engine the ventilating fluid may be supplied to a turbine bearing assembly for cooling purposes and/or to prevent leakage of lubricating oil on to highly heated parts, or it may be caused to flow in contact with turbine rotor parts for cooling purposes.

More specifically a rotary machine as defined in any of the four preceding paragraphs may comprise a ventilating system and openings for admitting fluid to the system from the compressing means at a plurality of stages of compression, admission at each stage opening above the lowest taking place through a valve the opening of which is dependent upon the ratio of the pressure in the ventilating system to a reference pressure falling below a predetermined minimum, and reverse flow through each stage opening below the highest being prevented by a non-return valve.

A particular embodiment of the invention consists in a gas turbine comprising independently rotating high and low-pressure compressors and having a ventilating system for cooling and/or oil sealing purposes wherein air is admitted to the ventilating system from the outlet end of the low-pressure compressor through a non-return valve and from the outlet end of the high-pressure compressor through a balanced valve operated by a piston urged in the closing direction by the pressure in the ventilating system and in the opening direction by atmospheric air and a spring.

Figure 2:
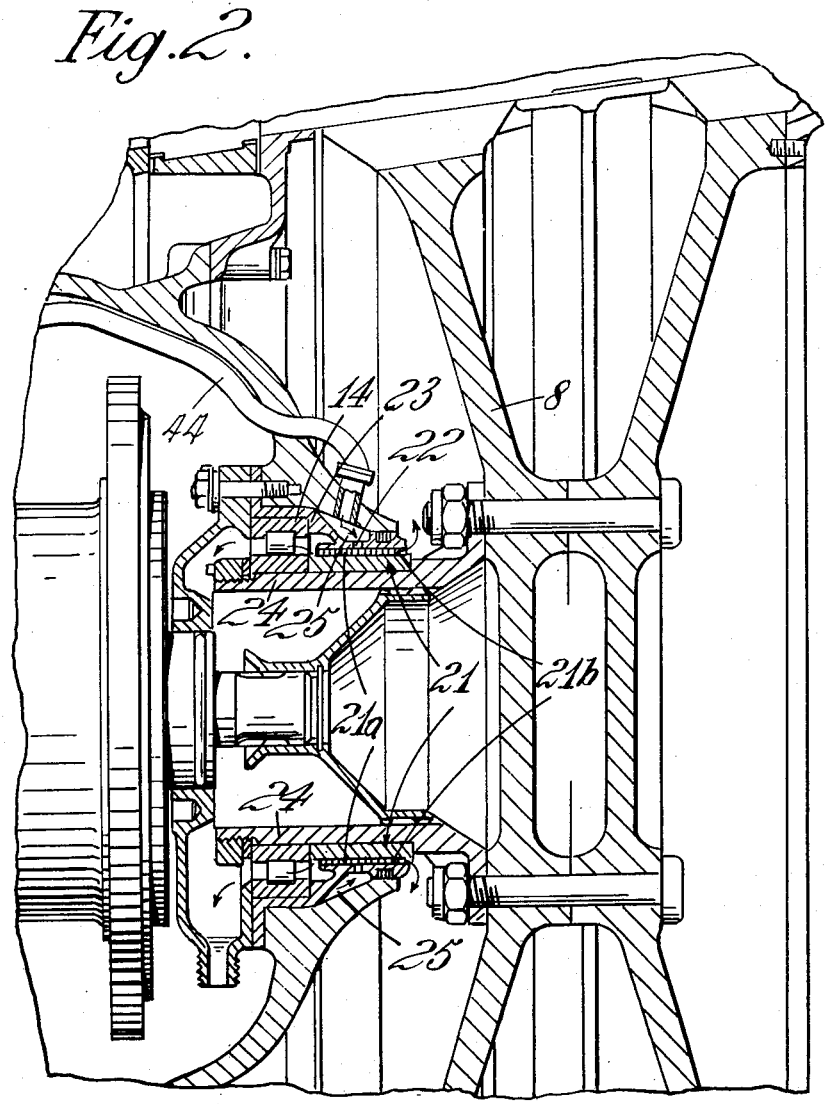

A practical embodiment of this invention as applied to a turbo-jet engine for aircraft propulsion will now be described, by way of example only, with reference to the accompanying drawings whereof:

Figure 1 is a diagrammatic sectional side elevation of the engine,

Figure 2 is a sectional elevation of one of the compressor bearings of the engine illustrated in Figure 1, to a larger scale, showing the details of bearing ventilation, Figure 3 is a sectional elevation of the turbine bearings of the engine of Figure 1, to a larger scale, showing the details of the bearing and turbine rotor ventilation, and Figure 4 is a sectional plan, to a larger scale, of the balanced valve of the high-pressure compressor of the engine of Figure 1.

Referring to Figure 1: the engine comprises a high-pressure axial flow compressor 5 connected by a hollow shaft 6 to a high-pressure turbine 7, and a low-pressure axial flow compressor 8 connected by a shaft 9 extending through the high-pressure system to a low-pressure turbine 10. Air from the high pressure compressor 5 passes through an annular combustion chamber 11 and the hot gases therefrom pass through the turbine blading. Each compressor is provided with an anti-friction bearing at each end of its rotor. Thus, compressor 5 is supported by bearings 12, 13 and compressor 8 by bearings 14, 15. Bearings 16, 17 are provided respectively on the upstream side of the high pressure turbine rotor 18 and on the downstream side of the low-pressure turbine rotor 19, all of these bearings being lubricated by oil jets, with a drainage system returning the oil to a sump. The several oil pipes of the drainage system are indicated in Figure 1 at 20. Provision is made (but not shown in the drawings) for bleeding air from the high pressure compressor for pressurising and ventilating the cabin of the aircraft in which the engine is used and it is therefore essential to exclude lubricating oil at all times from the air flow passages of the compressors. For this purpose, as will now be described with reference to bearing 14 of compressor 8—more fully shown in Figure 2—a labyrinth seal 21, is provided on the rotor side of the compressor bearing 14 between the bearing housing 23 and the shaft 24, the seal being divided into two parts 21a, 21b by a groove 22 into which air is admitted from a chamber 25 connected by a ventilating air system of pipes and internal passages extending over the whole engine and more fully described hereinafter. A similar arrangement is provided for bearings 12, 13 and 15. The air from groove 22 passes along part 21a, of labyrinth seal 21 towards bearing 14 and prevents the passage of oil in the reverse direction and thence oil contamination of the air going through compressor 8. The air passing along part 21b escapes to the annular air passage of the compressor 8.

A similar arrangement is also provided for the turbine bearings 16 and 17 as illustrated in Figure 3. Referring to this figure a chamber 125 of bearing 16 (corresponding to chamber 25 in bearings 12, 13, 14 and 15) is in communication with space 30 and in turn with annulus 31—see also Figure 1—which is supplied with ventilating air as later described. Air from annulus 21 also passes along channel 32 to groove 33 to parts 121a and 121b of seal 121 to supplement the air from chamber 125. The chamber 225 of bearing 17 (corresponding to chamber 125 of bearing 16) also receives air from the ventilating air system of pipes later described through channel 34 and a pipe 44. The air passing through bearing 16 is conveyed away by its associated pipe 201 of the drainage system.

The seals 121, 221 of bearings 16 and 17 respectively prevent the flow of hot products of combustion through the bearing housings. The air escaping along part 221b of seal 221 of bearing 17 towards rotor 19 flows outwardly over the surface of the latter and provides a useful cooling effect and joins the gas stream leaving the turbine. The air leaking along parts 221a of seal 221 of bearing 17 passes through the bearing and is then conveyed away by drain pipe 20 of the drainage system.

Under normal running conditions the ventilating air system is supplied with cool air from the outlet of the low pressure compressor 8 through a bleed passage 36 (Figure 1) provided with a non-return valve 37 and by main pipe 43 and branch pipes 44 to the chamber 25 of bearing 14 and the corresponding chambers of the other bearings 12, 13, 15, and 17, the air also passing into space 31 from an associated pipe 44 and thence to the chamber 125. The pressure of the ventilating air from compressor 8 is below that of the gases entering the high pressure turbine and to prevent the gases flowing back through the bearing 16 a further supply of high pressure air, obtained from space 38 around the inside of the combustion chamber, is supplied to space 39 (Figure 3) and thence to chamber 40. From chamber 40 high pressure air, which is hot but substantially less so than the gas stream entering the turbines, flows forwardly and rearwardly, the flow to the rear passing over the surface of rotor 18 and joining the gas stream entering its blading, and the flow forward escaping through a labyrinth seal 41 and mingles with the air leaking rearwardly from part 121b of bearing 16 as already described. These mixed leakages pass over the outside of a wall 42 and are discharged to atmosphere.

To prevent oil leakage into the compressors, and overheating of the turbine bearings when the engine is idling or running down to stop, or when it is being started by the starter, which operates only on the high pressure compressor 5 and turbine 7, provision is made for admitting air into the main pipe 43 of the ventilating system from the outlet of the compressor 5 when the low-outlet pressure of compressor 8 is inadequate. The flow of high-pressure air to pipe 43 is controlled by a balanced valve 45 (Figure 4) of the cylindrical gate type having a movable element or gate in the form of a hollow cylindrical member slidable in a bore in a fixed element to regulate the area of an annular opening, and therefore, the flow of air through said opening, from an annular chamber in said fixed element and around the gate, into said bore. Referring to Figure 4, the annular chamber 46 around the cylindrical gate 47 is connected to a bleed passage 48 (see also Figure 1) from the outlet of the high-pressure compressor, while the interior 49 of the gate is connected into the main pipe 43, at 50. The interior 49 of the gate also communicates with one side of a piston 51 which has a stem 60 to which the gate 47 is attached by radial arms 61 so that the gate moves with the piston 47. The piston 51 operates in a stationary cylinder 52 and the pressure in the interior of the gate 49 which is equal to the pressure in the main pipe 43 of the ventilating system acts on the piston so that it tends to hold the gate closed against its seating 55. The other side of the piston is subjected to atmospheric pressure and a reference pressure provided by a coil spring 53, the latter being adjustable by screwing in or out a cap 54 providing an abutment for the spring. When the pressure in the main pipe 43 of the ventilating system is atmospheric, as when the engine is not running, the valve is held fully open by the spring, so that the main pipe 43 receives air from the compressor 5 as soon as this is running. As the pressure in the main pipe 43 builds up the valve 45 gradually closes and prevents the pressure in the main pipe 43 rising above a value the reference pressure determined by the adjustment of the spring 53. When the low-pressure compressor 8 has speeded up sufficiently to match this reference pressure, the non-return valve 37 opens, and a further rise of pressure closes the balanced valve 45 so that the ventilating duty is wholly taken over by the low-pressure compressor until such time as its delivery pressure becomes inadequate for this purpose. At those times when the high pressure compressor is supplying air to the ventilating system it is only operating at a low output and the temperature of the air is therefore not so high as under normal running loads.

The invention is of course applicable to engines having any number of compressors, whether separately driven or not, provided that air can be bled off at alternative stages during the compression process, and it is also applicable to compressors driven by means other than gas turbines since substantial benefits are to be derived therefrom unconnected with the nature of the source of driving power.

We claim:

1. In a rotary machine comprising fluid-compressor means, a working part which during operation of the rotary machine requires to be ventilated, and a duct connected to said compressor means for conveying fluid compressed in said compressor means to said working part to ventilate same; the combination with said compressor means of a first fluid tapping in said compressor means at a location at which, during operation of said compressor means, there exists a pressure higher than the inlet pressure of said fluid-compressor means, a second fluid tapping in said fluid-compressor means at a location at which, during operation of said fluid-compressor means, there exists a pressure higher than said pressure at said first tapping, a first fluid connection connecting said first fluid tapping with said duct, a second fluid connection connecting said second fluid tapping with said duct, a non-return valve in said first fluid connection, said non-return valve permitting flow of fluid from said fluid-compressor means through said first connection into said duct, valve means in said second fluid connection, said valve means comprising a fixed element having a port communicating said second tapping with said second fluid connection, a movable element movable from a closed position in which it closes said port to an open position in which said port is open and allows fluid to pass from said second tapping through said second fluid connection into said duct, and actuating means responsive to the pressure in said duct connected to said movable element to move said movable element towards its closed position when the pressure in said duct rises above a predetermined value and vice versa.

2. A rotary machine as claimed in claim 1, wherein said working part is an oil lubricated bearing, and wherein said machine further comprises a shaft supported in said bearing, a bearing housing enclosing said bearing, a chamber bounded in part by at least part of said bearing housing and at least part of said shaft, said chamber being in communication with a working fluid passage of said compressor means, sealing means around said shaft between the interior of said bearing housing and said chamber, and means to supply ventilating fluid to said sealing means from said duct during operation of said rotary machine, whereby oil is prevented from leaking past said sealing means into said chamber.

3. A gas turbine engine comprising a fluid-compressor means, combustion equipment connected to be supplied with working fluid compressed in said fluid-compressor means, a turbine connected to be supplied with hot products of combustion from said combustion equipment and including a turbine rotor, a turbine shaft connected to said turbine rotor, a bearing rotatably supporting said shaft, which bearing requires to be ventilated during operation of the gas turbine engine, a duct for conveying working fluid compressed in said compressor means to said bearing to ventilate same, a first fluid tapping in said compressor means at a location at which, during operation of said fluid-compressor means, there exists a pressure higher than the inlet pressure of said compressor means, a second fluid tapping in said fluid-compressor means at a location at which, during operation of said fluid-compressor means, there exists a pressure higher than said pressure at said first tapping, a first fluid connection connecting said first fluid tapping with said duct, a second fluid connection connecting said second fluid tapping with said duct, a non-return valve in said first fluid connection, said non-return valve permitting flow of fluid from said fluid-compressor means through said first connection into said duct, valve means in said second fluid connection, said valve means comprising a fixed element having a port communicating said second tapping with said second fluid connection, a movable element movable from a closed position in which it closes said port to an open position in which said port is open and allows fluid to pass from said second tapping through said second fluid connection into said duct, and actuating means responsive to the pressure in said duct connected to said movable element to move said movable element towards its closed position when the pressure in said duct rises above a predetermined value and vice versa.

4. A gas turbine engine as claimed in claim 3 wherein said bearing is an oil lubricated bearing and said engine further comprises a bearing housing enclosing said bearing, a chamber bounded in part by at least part of said bearing housing and at least part of said shaft, said chamber containing highly heated parts, sealing means around said shaft between the interior of said bearing housing and said chamber, said duct supplying ventilating fluid to said bearing through said sealing means whereby oil is prevented from leaking past said sealing means into said chamber.

5. A gas turbine engine as claimed in claim 4 wherein said chamber contains said turbine rotor, and said duct also supplies ventilating fluid to said chamber through said sealing means, the ventilating fluid entering said chamber through said sealing means flowing over the turbine rotor to cool it.

6. In a rotary machine comprising a fluid-compressor means, a working part, which during operation of the rotary machine, requires to be ventilated, and a duct connected to said compressor means for conveying fluid compressed in said fluid compressor means to said working part to ventilate same; the combination with said fluid compressor means of a first fluid tapping in said fluid-compressor means at a location at which during operation of said fluid-compressor means, there exists a pressure higher than the inlet pressure of said fluid-compressor means, a second fluid tapping in said fluid-compressor means at a location at which, during operation of said fluid-compressor means there exists a pressure higher than the pressure at said first tapping, a first fluid connection connecting said first fluid tapping with said duct, a second fluid connection connecting said second fluid tapping with said duct, a non-return valve in said first fluid connection, said non-return valve permitting flow of fluid from said fluid-compressor means through said first connection into said duct, a source of reference pressure, valve means in said second fluid connection, said valve means comprising a fixed element having a port communicating said second tapping with said second fluid connection, a movable element movable from a closed position in which it closes said port to an open position in which said port is open and allows fluid to pass from said second fluid tapping through said second fluid connection into said duct, and pressure actuating means connected to said duct, and to said source of reference pressure, said pressure actuated means being actuable by the differential pressure between the pressure in said duct and said reference pressure to move said movable element towards its closed position when said differential pressure rises above a predetermined value and vice versa.

7. A gas turbine engine comprising a low pressure fluid-compressor, a high pressure fluid-compressor rotatable independently of said low pressure fluid compressor and connected to receive working fluid discharged from said low pressure fluid compressor, a working part which during operation of the gas turbine engine requires to be ventilated, a duct for conveying compressed fluid to said working part to ventilate same, a first tapping from the outlet end of said low pressure compressor, a first fluid connection connecting said first fluid tapping to said duct, a non-return valve in said first fluid connection, said non-return valve permitting flow of fluid from said outlet end of said low pressure compressor through said first fluid connection into said duct, a second fluid tapping from the outlet end of said high pressure compressor, a second fluid connection connecting said second fluid tapping to said duct, a balanced valve in said second fluid connection, said balanced valve comprising a fixed element having a port communicating said second fluid tapping with said second fluid connection, and a movable element movable from a closed position in which it closes said port to an open position in which said port is open and allows fluid to pass from the outlet end of said high pressure compressor through said second fluid connection into said duct, a piston connected to said movable element to move said element to its open and closed positions, a cylinder for said piston, the cylinder communicating with said duct on one side of the piston such that increases of pressure on said one side of the piston tends to move said movable element towards its closed position, a port and an abutment in said cylinder on said other side of said piston, and a compression spring between said piston and said abutment.

References Cited in the file of this patent
UNITED STATES PATENTS

| 2,414,788 | Altorfer et al. | Jan. 28, 1947 |
| 2,614,797 | Kidney | Oct. 21, 1952 |
| 2,620,157 | Morley et al. | Dec. 2, 1952 |

FOREIGN PATENTS

| 586,710 | Great Britain | Mar. 28, 1947 |